Patented Jan. 26, 1943

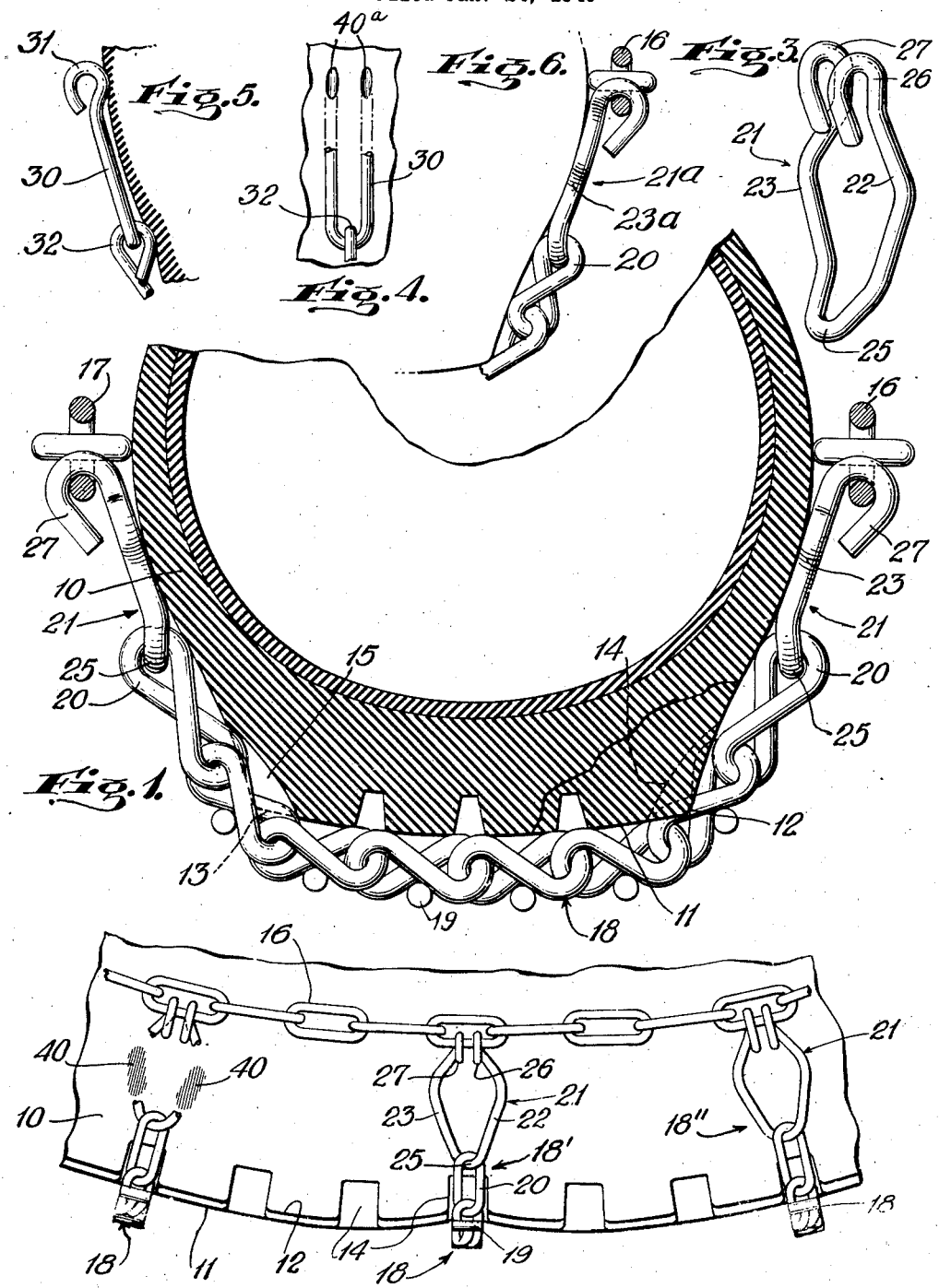

2,309,215

UNITED STATES PATENT OFFICE 2,309,215

CROSS CHAIN HOOK

John R. Reyburn, Fairfield, Conn., assignor to American Chain & Cable Company, Inc., New York, N. Y., a corporation of New York Application January 24, 1940, Serial No. 315,318

3 Claims. (Cl. 59—93)

This invention relates to improvements in cross chain hooks.

Wear on the side walls of tires by cross chains and cross chain hooks, several years ago, was a negligible factor because at that time the outside cross sectional shapes of the tires were approximately circular. The present day tires with a wide flattened tread have a somewhat rectangular outside cross sectional shape and distort the catenary shape the cross chains tend to assume in service, to a point where substantial pressure develops between the cross chain hooks, cross chains, and side walls of the tire producing greater wear at these points of contact which may become localized circumferentially of the tire when such cross chains are used with tires provided with transverse slots in and at the corners or edge beads of the tread which lock the cross chains against creeping. As each tire cross chain is run over by the tire each of its cross chain hooks moves inwardly in a radial direction and then outwardly upon being released and this radial movement of the cross chain hook in current tire constructions wears two small ellipses in the side wall at the point of connection of the eyes of the hook with the side chain. This wear continues at times through the rubber coating on the side wall which is thin at this point, and into the fabric and sometimes through the fabric even causing blow outs. The end link of the cross chain proper connected to the hook is drawn into tight contact with the side wall of the tire causing wear of the tire at this point which however may not be as serious as the thickness of the rubber coating at this latter point is greater than at the point where the hook eyes of the cross chain hook engage the side wall of the tire.

Hooks of prior constructions which have closely spaced legs also are more readily rotated by turning forces transmitted thereto by the rolling movement of the cross chain under traction. This also causes the hook to move into an angular position with respect to the side wall of the tire and causes the end link of the cross chain to be embedded in and wear the side wall of the tire.

Among the objects of my invention is the provision of a cross chain hook which may be used with a tire of any cross sectional shape, but which has been provided more particularly for use with tires of the current somewhat rectangular outside cross sectional shape whether provided with plain or slotted edge beads, the construction being such that wear between the hook eyes of the cross chain hook and the side wall of the tire is substantially eliminated, that wear between the body of the hook and the side wall of the tire is reduced substantially because of the greater contact area between the hook and tire, that wear between the hook connected end of the end link of the cross chain proper and the tire is substantially eliminated, and that the cross chain is restrained against excessive rolling movement during traction.

Other objects of this invention will appear from the following description taken in connection with the drawing in which—

Fig. 1 is a cross section through the tire and the side chains of a tire chain mounted thereon;

Fig. 2 is a side view of a portion of a tire and a tire chain mounted thereon as viewed from the right of Fig. 1;

Fig. 3 is a front perspective view of my improved cross chain hook;

Fig. 4 is a face view of a cross chain hook of prior construction shown in engagement with the side wall of the tire;

Fig. 5 is a side view of the cross chain hook shown in Fig. 4 and the hook connected end of an end link of the cross chain pressed into the tire; and Fig. 6 is a side view of a modified form of cross chain hook.

In Fig. 1 I have shown in cross section a tire 10 of a cross sectional shape now most generally used. This tire is provided with a substantially flat tread surface 11 and with corners or edge beads 12 and 13 which have been disclosed as provided with transverse slots 14 and 15.

My invention has been shown in connection with a common form of anti-skid tire chain which comprises side chains 16 and 17 and cross chains 18 comprising links reinforced by cross bars 19 as indicated. The end links 20 of the cross chains are connected to the side chains by hooks 21 constructed in accordance with my invention.

This hook is disclosed in front perspective view in Fig. 3, in face view in Fig. 2, and in side view in Fig. 1 and is preferably formed from a single continuous piece of wire bent generally into hairpin shape. The main body of the hook is constituted by the legs 22 and 23 which as indicated in Fig. 1 lie in the same plane as viewed in this figure and appear to be straight and to engage the side walls of the tire substantially tangentially. The legs 22 and 23 when viewed as in Figs. 2 and 3 are bowed outwardly intermediate of their ends so as to materially increase the width of the body of the hook and also to materially increase the amount of contact surface between the hook and the side wall of the tire. The closed or loop end 25 of the hook is bent out of the plane of the body of the hook as best disclosed in Fig. 1 to support the connected end of the end link 20 of the cross chain in such position with respect to the side wall of the tire as to prevent or at least substantially eliminate wear on the side wall of the tire. The free ends of the legs 22 and 23 of the hook are provided with hook eyes 26 and 27 bent out of the plane of the body of the hook and on the same side as the closed or loop end 25 to support the side chain in such position with respect to the side wall of the tire, as to eliminate or at least substantially reduce wear between the side chain and the tire, and to prevent wear between the hook eyes and the side wall of the tire as might otherwise occur as is apparent from Figs. 4 and 5 in which an old form of hook 30 has been illustrated to show how the hook eyes 31 of the old form of hook and the hook connected end of the end link 32 of the cross chain are pressed into the side wall of the tire. By means of the hook of my invention, the hook connected end of the end link 20 of the cross chain is supported with no or but slight contact pressure on the side wall of the tire. The wear between the hook of my construction and the side wall of the tire occurs where the body of the hook rubs on the side wall of the tire at which point the thickness of the rubber coating is substantial, and the wear is distributed over a greater area than in the case of the old form of hook. Furthermore because of the increase in width of the hook rolling of the cross chain and the hook is greatly resisted.

In Fig. 2 I have disclosed in side view a tire chain and tire with a cross chain 18' run over by the tire and with an adjacent cross chain 18" just before it is run over by the tire. The central tread section of the cross chain 18" has been pulled away from the tire by centrifugal force pulling the end links of the cross chain into the notch 14 in the edge bead of the tire. This prevents any creeping movement between the tire chain and tire. The hook has been pulled radially outwardly beyond its normal idle position while in contact with the side wall of the tire. When the tire runs over this cross chain as indicated at 18' the hook is pulled inwardly beyond its normal idle position. The hook moves radially inwardly and outwardly while in frictional contact with the tire, and will wear the tire as indicated at 40. From an inspection of Fig. 1 it will be noticed that the wear occurs at a point in the casing where the coating of rubber is thicker than at the point of the casing 40a at which the wear produced by the hook eyes of the hooks of prior constructions occurs. Also due to the fact that the bowed legs have a larger contact area with the tire, the depth of wear produced during their radial movements is less. It has been found that the wear produced at 40 is not sufficient to wear through the rubber coating of the casing and that when cross chains are connected to side chains by hooks of the character disclosed such chain constructions may be used with tires of the current cross sectional shape, even those provided with notches in their edge beads which tend to lock the cross chains and localize the wear on the side walls of the tire.

In Fig. 6 I have shown a slightly modified form of cross chain hook 21a in which the legs one of which is indicated at 23a, are bent to conform to the curvature of the side wall of the tire to increase the contact area between the body of the hook and the side wall of the tire and distribute the wear between the hook and side wall of the tire over a still greater area and further reduce the depth of wear at this point and to better perform its functions of supporting the side chain and hook connected end of the end link 20 in such relation to the side wall of the tire as to reduce the amount of wear at these points.

While for the purpose of disclosure I have illustrated a special form of cross chain hook and described it with particularity, it is to be understood that after understanding my invention modifications will be apparent and that it is my intention to cover all such changes as fall within the principles of this invention and the scope of the appended claims.

I claim:

1. A cross chain hook link for connecting the end link of a cross chain to a link of a side chain, constructed of a single piece of wire bent into general hairpin shape, the intermediate portions of the legs of the hook link lying in the same plane and adapted to lie on and extend tangentially of a curved side wall of a tire, the loop end of the hook link being bent out of the plane of the intermediate portions of the legs of the hook link to support the end link of the cross chain so as to prevent the same from being pressed into the side wall of the tire when the cross chain tends to assume the shape of a catenary during service, and the free ends of the legs of the hook link being provided with connecting eyes bent out of the plane of the intermediate portions of the legs of the hook link to prevent engagement between said eyes and tire and to support so as to prevent the connected link of a side chain from being pressed into the side wall of the tire and to prevent wear on the tire by said eyes, the legs of said hook link being bent outwardly away from each other intermediate of their ends to provide a relatively wide body portion bearing against the side wall of the tire to resist rotating movements of the cross chain and to provide a relatively large contact surface with the side wall of the tire to distribute the wear of the hook link on the side wall of the tire.

2. A cross chain hook link for connecting an end link of a cross chain to a link of a side chain, constructed of a single piece of wire bent into general hairpin shape, the intermediate portions of the legs of the hook link adapted to lie on and conform substantially to the contour of a side wall of a tire and having their end portions spaced from the side wall of the tire, the loop end of the hook link being bent outwardly from said intermediate portions of the legs of the hook link to support the end link of the cross chain so as to prevent the same from being pressed into the side wall of the tire when the cross chain tends to assume the shape of a catenary during service, and the free ends of the legs of the hook link being provided with connecting eyes bent outwardly from said intermediate portions of the legs of the hook link to prevent engagement between said eyes and tire and to support so as to prevent the connected link of the side chain from being pressed into the side wall of the tire and to prevent wear on the tire by said eyes, the legs of said hook link being bent outwardly away from each other intermediate of their ends to provide a relatively wide body portion bearing against the side wall of the tire to resist rotating movements of the cross chain and to provide a relatively large contact surface with the side wall of the tire to distribute the wear of the hook link on the side wall of the tire.

3. A cross chain hook link of general hairpin shape comprising a loop at one end and connecting eyes formed on the free ends of the legs of the hook link, the intermediate portions of the legs of the hook link lying in the same plane and bent outwardly away from each other to provide a wide body having a large wearing surface for contact with the wall of a tire, said loop and eyes being bent out of the plane of the body of the hook link and lying on the same side of the hook link.

JOHN R. REYBURN.